Patented Nov. 14, 1950

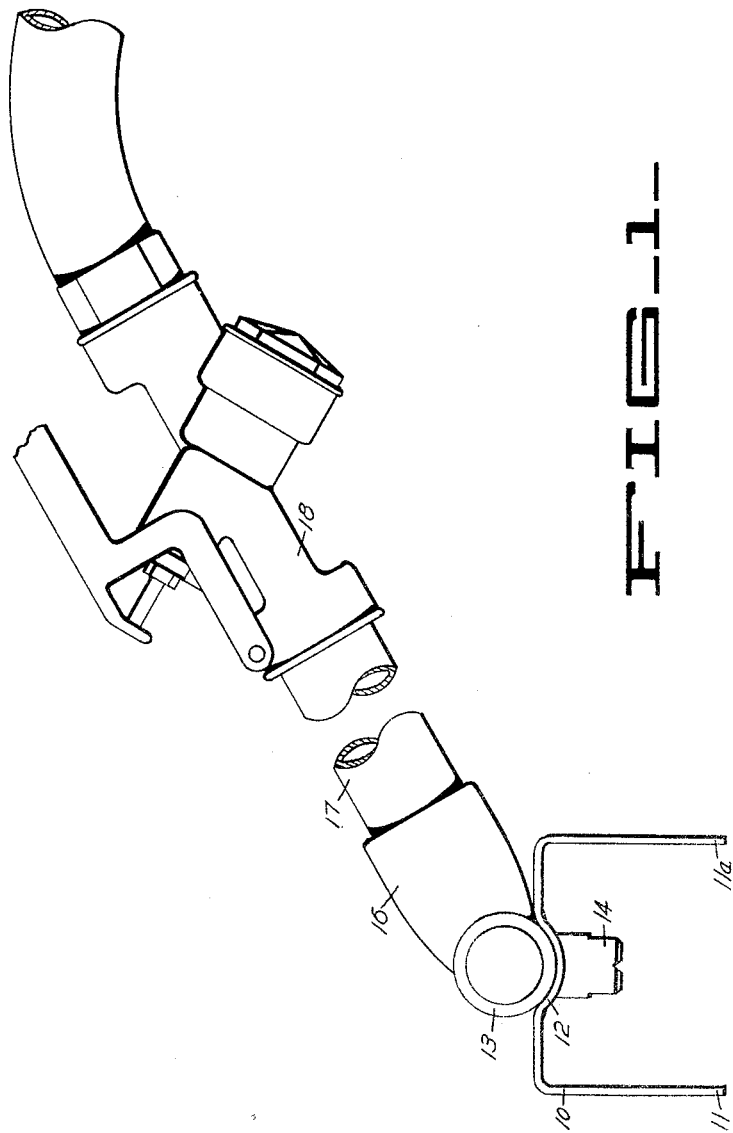

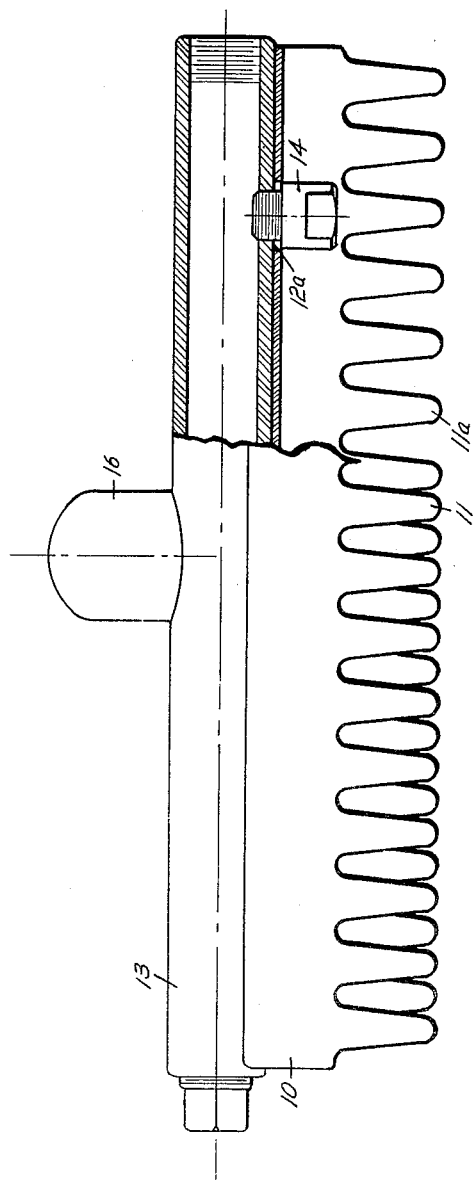

2,529,531

UNITED STATES PATENT OFFICE 2,529,531

GRUB SCRUBBER

William Abildgaard and Charles C. Herbert, San Jose, Calif., assignors to Livestock Sprayer Mfg. Co., San Jose, Calif., a corporation of California Application March 17, 1947, Serial No. 735,151

2 Claims. (Cl. 119—156)

This invention relates to apparatus for treating livestock such as cattle for control of "grubs" or warble flies, and is concerned more particularly with the provision of improved apparatus for opening the sores caused by the larvae of the flies under the skin of the animal and for removing the grubs in the sores and applying an insecticide.

One of the worst pests of livestock and cattle, and particularly as far as control methods are concerned, is the warble fly, such as *Hypoderma lineata* and *Hypoderma bovis*, which lay their eggs on the heels or legs of cattle. The eggs, after being laid on the heels or legs of cattle, hatch into a little worm within one or two days. This worm penetrates the hide and works its way through the tissues up the leg, along the stomach until it reaches the neck, then on rearward, finally locating in the back just underneath the hide, and between the hip and shoulder. About 30 to 35 days before the grub reaches maturity, it bores a hole through the hide, and immediately pus and corruption form a scab over this hole which must be removed before insecticide can enter the hole to kill the grub. We have discovered that such grubs or warbles can be controlled effectively by raking the back of an animal with a specially constructed rake to remove the scab and provide access to the infested hole, to squeeze the sores to remove the pus and grubs, and to apply an insecticide to kill the grub and to facilitate healing of the wound.

Accordingly, it is a general object of the invention to provide improved apparatus for treating cattle for pests such as warbles.

Another object of the invention is to provide apparatus of the above character which is effective in operation and which can be moved readily over the hide of the animal without entering or being obstructed by the infected or infested holes in the skin.

A further object of the invention is to provide an improved scrubber of the above character having associated therewith means for applying an insecticide.

Another object of the invention is to provide a scrubber of the above character which is self-cleaning.

Other objects and advantages of the invention will be apparent from the following description of a preferred embodiment thereof as illustrated in the accompanying drawings, in which:

Figure 1 is a side elevational view of the apparatus.

Figure 2 is a front elevational view of the rake, partially broken away to illustrate details of construction.

Referring to the drawings, the apparatus comprises a scrubber or rake 10 having a plurality of rows of teeth 11 and 11a which are formed from sheet metal by a blanking and forming operation from a single piece of material which includes a connecting support portion 12 of the sheet metal. The teeth are all similar and taper gradually toward the ends to a rounded blunt end surface to provide a gentle combing or raking action. Preferably, the end width of the teeth is at least that of the average sore, and a width of about one-quarter inch has been found satisfactory. The spacing apart of adjacent teeth 11 or 11a is selected to approximate the desired spacing to exercise an expelling pressure with respect to a sore when a pair of adjacent teeth straddle a sore and an effective spacing has been found to be from about one-quarter to one-half inch. Also, the teeth in the rows 11 and 11a are evenly staggered so that a tooth 11a as viewed from the front of the rake is symmetrically spaced between a pair of adjacent teeth 11 and vice versa. In this way if one tooth removes the scab from a sore, the following pair of teeth exert pressure at either side of the sore to expel the pus and/or grub therefrom. Also this staggered tooth construction provides for substantially complete treatment of the warbles in a given area in one pass or stroke of the rake. By employing a plurality of pairs of rows of blunt teeth, a smooth raking action is obtained without substantial penetration of the teeth within the holes formed by the grubs so that the teeth move smoothly over the hide of the animal and are not caught by a hole so as not to cause injury to the teeth or the animal's skin.

The connecting portion 12 of the teeth of the rake structure is recessed intermediate adjacent rows of teeth 11 and 11a to receive a re-inforcing tube 13 which may be welded thereto. The tube 13 in addition to forming a frame piece of the rake provides a reservoir or passage for insecticide. At spaced points the intermediate portion 12 of the rake structure is broken away or recessed as at 12a to permit insertion of a removable nozzle 14 into the conduit 13. These nozzles 14 are of a character to provide a relatively flat fan-shaped spray which not only covers the area passed over by the rake and wets it thoroughly with insecticide, but also actually impinges upon the teeth of the rake to clean them of the hair of the animal or other debris.

Welded to and communicating with the conduit 13 is a pipe section 16 which is threaded to receive a pipe handle 17 carrying at its upper end a trigger-type shut-off valve 18. The valve 18 may be connected through a hose to a suitable source of insecticide under pressure, for example, a pump of the character disclosed in the copending application of William Abildgaard and William H. Abildgaard, Serial No. 703,891, filed October 17, 1946 for Livestock Sprayers.

Alternatively, the rake may be employed with a source of high pressure, in which event the type of nozzle employed is changed to provide the desired flow of liquid through the nozzle.

The spacing between the two rows of teeth 11 and 11*a* is such that, when the teeth of the two rows are pressed against a hide being treated along lines of contact respectively on opposite sides of a sore or sores in the hide, the pressure exerted along these lines will inherently cause the intervening hide part to bulge outwardly with a convex curvature. Consequently the outer parts of sores, from which scabs have been removed as explained above, will be opened or disturbed to enable the sprayed insecticide to enter and penetrate the sore cavity.

While we have shown and described certain preferred embodiments of the invention, it will be apparent that the invention is capable of further variation and modification and its scope should be limited only by the scope of the claims appended hereto.

We claim:

1. In a grub scrubber for treating livestock, a rake structure comprising a pair of spaced apart parallel rows of teeth connected by a central support portion extending substantially transversely to the teeth and offset from the working ends thereof, the respective teeth of the rows being evenly staggered with respect to each other and the working ends of the teeth being blunt and, for the removal of the grub of the warble fly, being approximately one-quarter inch in width, and the spacing between adjacent teeth being approximately from one-quarter to one-half inch to provide complete treatment of the area covered by the rake structure, the spacing of said teeth providing for straddling of a sore in the area being treated to exert a squeezing action thereon, the spacing of said rows being approximately four times the spacing of adjacent teeth in said rows to enable said rows to contact the hide being treated along lines respectively on opposite sides of sores in the hide so that pressure exerted on said hide along said lines of contact will cause the hide part intervening between said lines to bulge outwardly with a convex curvature to thereby open the outer parts of the sores, a conduit member mounted on said rake structure and extending between said rows of teeth and being spaced from said rows, and nozzle means on said conduit member substantially equidistant from the respective rows of teeth, and spaced from each of said rows for directing spray of insecticide directly on sores held open by the teeth of said two rows pressing simultaneously on the hide along said lines of contact.

2. In a grub scrubber for treating livestock, a rake structure comprising an integrally formed pair of spaced apart parallel rows of teeth connected by a central support portion extending substantially transversely to the teeth and offset from the working ends thereof, the respective teeth of the rows being evenly staggered with respect to each other and the working ends of the teeth being blunt and, for the removal of the grub of the warble fly, being approximately one-quarter inch in width, and the spacing between adjacent teeth being approximately from one-quarter to one-half inch to provide complete treatment of the area covered by the rake structure, the spacing of said teeth providing for straddling of a sore in the area being treated to exert a squeezing action thereon, the spacing of said rows being approximately four times the spacing of adjacent teeth in said rows to enable said rows to contact the hide being treated along lines respectively on opposite sides of sores in the hide so that pressure exerted on said hide along said lines of contact will cause the hide part intervening between said lines to bulge outwardly with a convex curvature to thereby open the outer parts of the sores, a rake reenforcing structure comprising a conduit member extending longitudinally between said rows of teeth and being fixed with respect to said support portion, and nozzle means carried by said conduit member and communicating with the conduit therein for spraying insecticide directly on sores held open by the teeth of said two rows pressing simultaneously on the hide along said lines of contact.

WILLIAM ABILDGAARD.
CHARLES C. HERBERT.

REFERENCES CITED

The following references are of record in the file of this patent:

UNITED STATES PATENTS

| Number | Name | Date |
|---|---|---|
| 335,972 | Howe | Jan. 26, 1886 |
| 717,377 | Flanders | Dec. 30, 1902 |
| 879,706 | Watson | Feb. 18, 1908 |
| 983,820 | Goff | Feb. 7, 1911 |
| 1,193,761 | Casler | Aug. 8, 1916 |
| 1,868,235 | Jaden | July 19, 1932 |

FOREIGN PATENTS

| Number | Country | Date |
|---|---|---|
| 16,568 | Great Britain | Dec. 2, 1887 |
| 694,142 | France | Nov. 28, 1930 |